(12) United States Patent
Cook (10) Patent No.: US 11,721,988 B2
(45) Date of Patent: Aug. 8, 2023

(54) METHODS AND SYSTEMS FOR AN EMERGENCY RESPONSE UNIT

(71) Applicant: Dana Automotive Systems Group, LLC, Maumee, OH (US)

(72) Inventor: Christopher M. Cook, McKenzie, TN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 55 days.

(21) Appl. No.: 17/098,147

(22) Filed: Nov. 13, 2020

(65) Prior Publication Data
US 2022/0153150 A1    May 19, 2022

(51) Int. Cl.
| | | |
|---|---|---|
| *H02J 7/00* | (2006.01) | |
| *B60L 53/16* | (2019.01) | |
| *B60L 58/26* | (2019.01) | |
| *B60L 53/55* | (2019.01) | |
| *B60L 53/62* | (2019.01) | |
| *B60L 58/16* | (2019.01) | |
| *H02J 7/34* | (2006.01) | |
| *H02M 1/32* | (2007.01) | |

(Continued)

(52) U.S. Cl.
CPC ............ *H02J 7/0031* (2013.01); *B60L 53/16* (2019.02); *B60L 53/55* (2019.02); *B60L 53/62* (2019.02); *B60L 58/16* (2019.02); *B60L 58/26* (2019.02); *H01M 10/488* (2013.01); *H02J 7/005* (2020.01); *H02J 7/0047* (2013.01); *H02J 7/342* (2020.01); *H02J 7/345* (2013.01); *H02M 1/327* (2021.05); *B60K 6/28* (2013.01); *B60Y 2200/91* (2013.01); *B60Y 2200/92* (2013.01); *B60Y 2300/91* (2013.01); *H01M 2010/4271* (2013.01); *H01M 2010/4278* (2013.01)

(58) Field of Classification Search
CPC ........ H02J 7/0031; H02J 7/0047; H02J 7/345; B60L 53/62; B60L 58/26; H01M 10/488; H01M 2010/4271; H01M 2010/4278; H02M 1/327
See application file for complete search history.

(56) References Cited

U.S. PATENT DOCUMENTS

| | | | |
|---|---|---|---|
| 7,705,602 B2 * | 4/2010 | Bertness | G01R 31/3648 324/426 |
| 9,059,486 B2 * | 6/2015 | Mackintosh | H01M 10/441 |

(Continued)

FOREIGN PATENT DOCUMENTS

| | | | |
|---|---|---|---|
| CN | 202207410 U | * | 5/2012 |
| CN | 103085669 A | | 5/2013 |

(Continued)

OTHER PUBLICATIONS

"Tesla's electric car crash under investigation," YouTube Website, Available Online at https://www.youtube.com/watch?v=xw2E3NVFbdM, May 13, 2018, 4 pages.

*Primary Examiner* — Naum Levin
(74) *Attorney, Agent, or Firm* — McCoy Russell LLP (57) ABSTRACT

Methods and system are provided for a discharge system. In one example, an emergency response vehicle, comprising a battery discharge system having a charging connector configured to electrically couple a capacitor of the emergency response vehicle to a battery of an electric vehicle.

18 Claims, 3 Drawing Sheets

(51) Int. Cl.
*H01M 10/48* (2006.01)
*B60K 6/28* (2007.10)
*H01M 10/42* (2006.01)

(56) References Cited

U.S. PATENT DOCUMENTS

| | | | |
|---|---|---|---|
| 9,566,868 B2 * | 2/2017 | Jammer | G07F 15/003 |
| 9,738,125 B1 * | 8/2017 | Brickley | B60W 50/14 |
| 10,075,005 B2 * | 9/2018 | Fisher | H02J 7/0063 |
| 10,777,856 B2 * | 9/2020 | Stachewicz | B60L 3/0007 |
| 11,203,263 B2 * | 12/2021 | Strasser | B60L 3/0007 |
| 2014/0015491 A1 * | 1/2014 | Namou | B60L 3/0069 320/135 |
| 2014/0070772 A1 * | 3/2014 | Andres | H02J 7/0016 320/136 |
| 2014/0132219 A1 * | 5/2014 | Namou | B60L 53/14 320/127 |
| 2015/0372477 A1 * | 12/2015 | Mo | B60L 3/0007 361/91.5 |
| 2018/0249474 A1 * | 8/2018 | Chu | H04W 72/048 |
| 2019/0131668 A1 * | 5/2019 | Bitauld | H01M 10/48 |
| 2019/0204392 A1 * | 7/2019 | Bertness | H01M 10/4285 |
| 2021/0001739 A1 * | 1/2021 | Murai | H02J 7/00309 |
| 2021/0141043 A1 * | 5/2021 | Bertness | H02J 7/0069 |
| 2022/0063445 A1 * | 3/2022 | Lee | G06F 17/18 |

FOREIGN PATENT DOCUMENTS

| | | | | | |
|---|---|---|---|---|---|
| CN | 204964713 | U | * | 1/2016 | |
| CN | 104203638 | B | * | 10/2017 | ............ B60L 3/0007 |
| CN | 207190809 | U | * | 4/2018 | |
| CN | 109641528 | A | * | 4/2019 | ............ B60L 3/0007 |
| CN | 109767604 | A | * | 5/2019 | ............ B60L 3/0046 |
| CN | 108001228 | B | * | 12/2019 | ................ B60L 3/00 |
| CN | 111267639 | A | * | 6/2020 | |
| CN | 111602263 | A | * | 8/2020 | ......... H01M 10/425 |
| CN | 111634192 | A | * | 9/2020 | |
| CN | 111873853 | A | * | 11/2020 | ............ B60L 3/0046 |
| CN | 112349988 | A | * | 2/2021 | ............ H01M 10/44 |
| CN | 112599867 | A | * | 4/2021 | |
| CN | 108688592 | B | * | 3/2022 | ............ B60L 3/0007 |
| CN | 114144233 | A | * | 3/2022 | ............. A62B 3/005 |
| CN | 114585791 | A | * | 6/2022 | ............. E05B 81/20 |
| CN | 114609465 | A | * | 6/2022 | |
| DE | 102015224541 | A1 | * | 6/2016 | ......... B60L 11/1866 |
| DE | 102017202391 | A1 | * | 8/2018 | |
| DE | 202019104363 | U1 | * | 10/2019 | |
| DE | 112019000492 | T5 | * | 10/2020 | ............ B60L 3/0046 |
| DE | 102020214081 | A1 | * | 5/2021 | ............ G01R 31/386 |
| DE | 102012109430 | B4 | * | 3/2022 | ......... H01M 10/425 |
| DE | 102020211786 | A1 | * | 3/2022 | |
| JP | 5356274 | B2 | | 12/2013 | |
| JP | 2017108571 | A | * | 6/2017 | |
| JP | 2018129154 | A | * | 8/2018 | ............. B60L 3/003 |
| JP | 6443308 | B2 | | 12/2018 | |
| JP | 2019161816 | A | * | 9/2019 | |
| JP | 2021197743 | A | * | 12/2021 | |
| KR | 20120010337 | A | | 2/2012 | |
| WO | 2013042215 | A1 | | 3/2013 | |
| WO | WO-2021255924 | A1 | * | 12/2021 | |

* cited by examiner

METHODS AND SYSTEMS FOR AN EMERGENCY RESPONSE UNIT

TECHNICAL FIELD

The present description relates generally to an emergency response unit configured to discharge a battery of an at least partially electrically driven vehicle.

BACKGROUND AND SUMMARY

Electrical vehicles are becoming increasingly common as manufacturers aim to decrease fleet emissions to meet government standards. Electric vehicles may include battery electric vehicles, plug-in hybrid electric vehicles, range-extended electric vehicles, fully electric vehicles and so on.

Following a vehicle collision or other event where deformation to the electric vehicle occurs, undesired electrical conditions may occur. In one example, electrical connections of the electric vehicle may be loosened or completely disconnected, resulting in exposed, charged electrical wires. In another example, fluids may begin to leak from the battery, wherein the fluids comprise a low pH and may be combustible. Thus, it may be desired to discharge the battery in response to a vehicle collision or event where deformation and/or rearrangement of vehicle components is beyond a threshold.

Other examples of addressing electric vehicle collision response include a battery switching unit that automatically disconnects the battery upon a vehicle collision. One example approach is shown in CN103085669, which teaches monomers into which the battery is discharged. The monomers are discharged into a predetermined monomer charge status level based on a condition of the battery.

However, the inventors have identified some issues with the approaches described above. For example, the monomers are arranged on the vehicle involved in the collision. Thus, the collision may degrade a functionality of the monomers, resulting in the batteries still comprising a charge following the collision. As such, there is still a desire for efficiently and accurately discharging batteries following an electric vehicle collision.

In one example, the issues described above may be addressed by an emergency response vehicle comprising a battery discharge system having a charging connector configured to electrically couple a capacitor of the emergency response vehicle to a battery of an electric vehicle. In this way, the battery may be reliably discharged independent of a deformation to the electric vehicle.

As one example, a vehicle operator of the emergency response vehicle may determine a deformation to the battery of the electric vehicle. Additionally or alternatively, the emergency response vehicle may comprise components that may automatically determine a magnitude of a deformation of the electric vehicle with little to no input from the vehicle operator. Upon determining the magnitude of the deformation, the emergency response vehicle may display instructions to the vehicle operator regarding discharging the electric vehicle battery. By doing this, the battery of the electric vehicle is discharged into the capacitor of the emergency response vehicle, thereby providing reliable transportation and storage conditions of the electric vehicle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
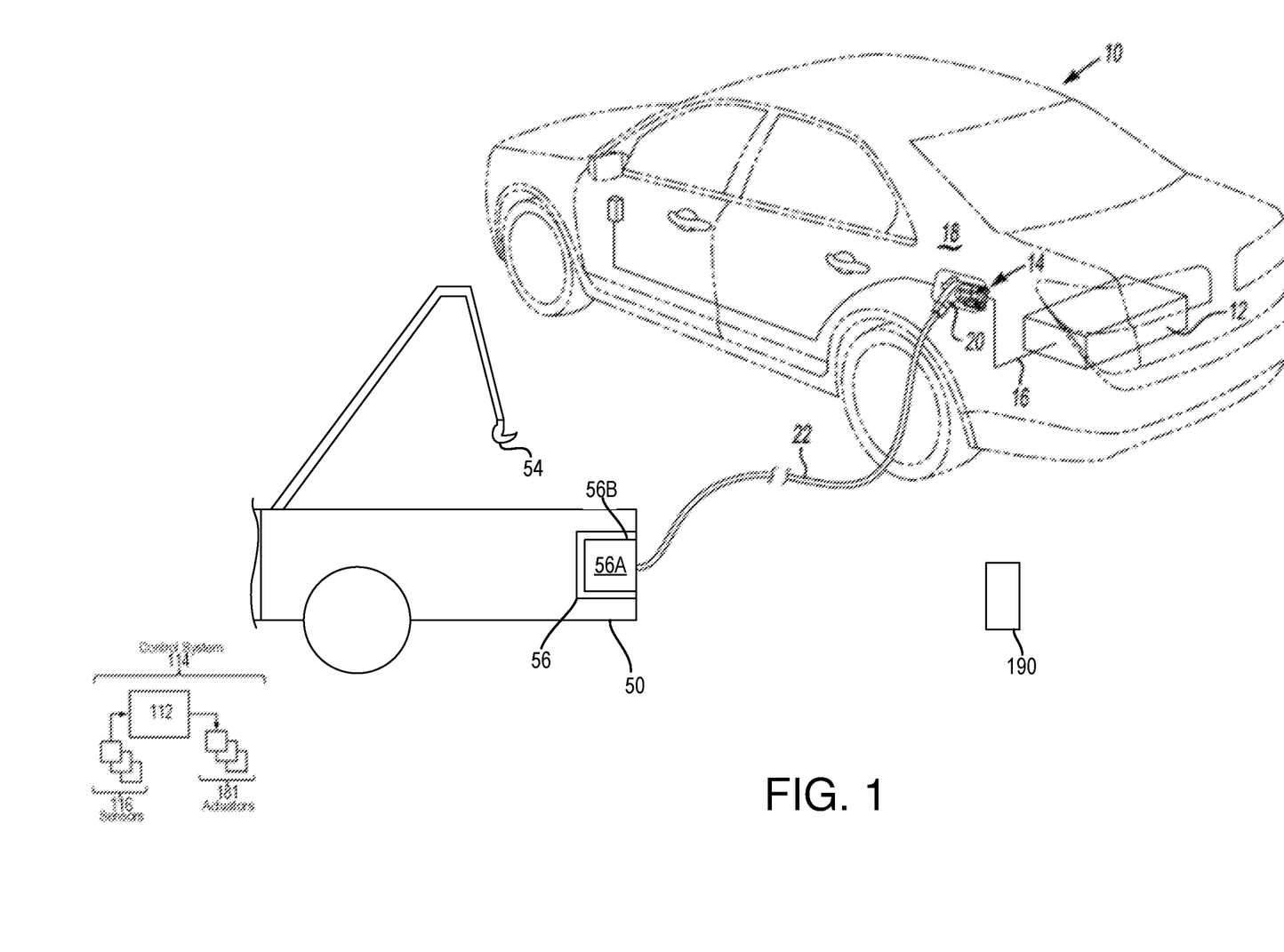
FIG. 1 shows a schematic of an emergency response vehicle and an electric vehicle.
Figure 2:
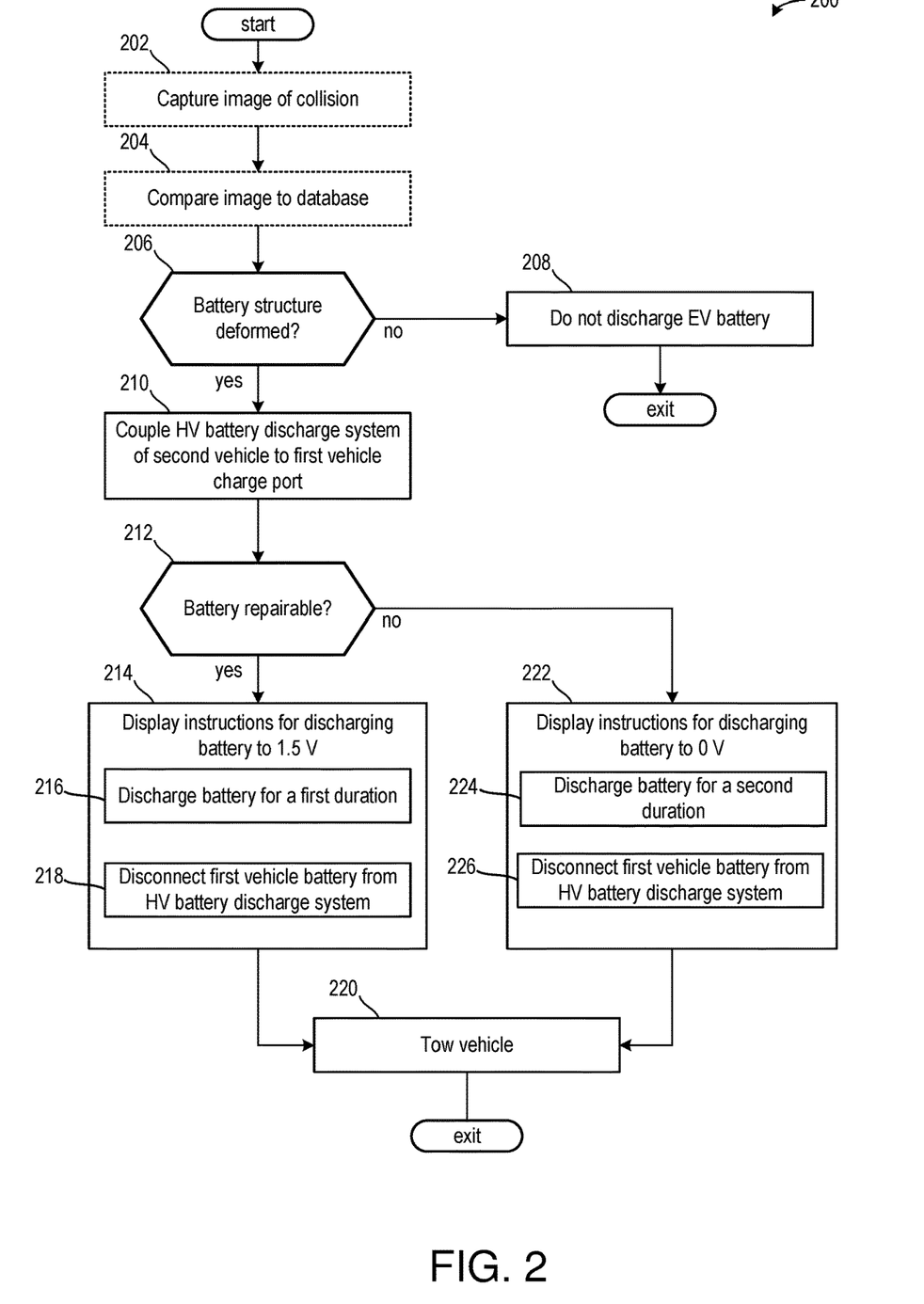
FIG. 2 shows a method for determining a deformation of a battery of the electric vehicle and providing instructions for discharging the battery in response to a magnitude of the deformation.
Figure 3:
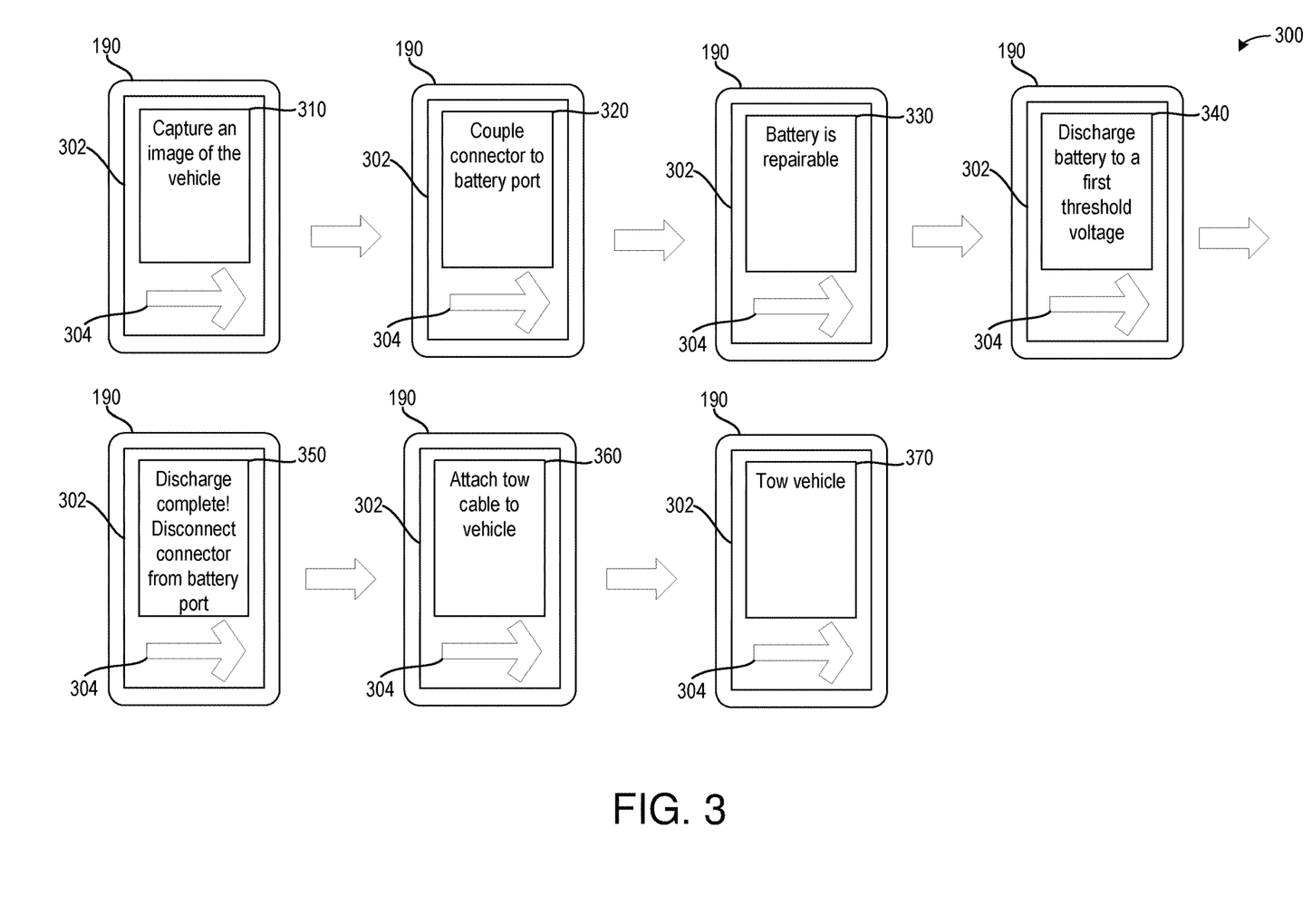
FIG. 3 shows an example of a mobile display device illustrating instructions to a responder to discharge a vehicle battery.

The following description relates to systems and methods for an emergency response vehicle comprising a high-voltage discharge system. The high-voltage discharge system may comprise a capacitor and a cooling arrangement, as illustrated in FIG. 1. The high-voltage discharge system is configured to drain a battery of an electric vehicle in response to a deformation of the battery being greater than a threshold. By doing this, the electric vehicle may be transported without the battery degrading even further. FIG. 2 illustrates a method for determining a magnitude of the deformation. The method may then display instructions to a vehicle operator of the emergency response vehicle to either discharge the electric vehicle to one of two threshold loads or to not discharge the battery. FIG. 3 shows an example of a mobile display device illustrating instructions to a responder to discharge a vehicle battery.

FIG. 1 shows an example configuration with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

With reference to FIG. 1, an electric vehicle 10 (hereinafter "first vehicle") is provided with an on-board battery 12, a charge port 14, and internal electrical connection 16 between the battery and charge port. Charge port 14 is located in or on a body panel 18 and may include a hinged or otherwise movable cover (not shown) that may be closed to hide the charge port when it is not in use. The first vehicle 10 may be any type of electric vehicle having a charge port 14 for receiving electrical power, such as a plug-in electric vehicle, a plug-in hybrid electric vehicle, a battery electric vehicle, a fuel cell vehicle, etc.

A charging connector 20 is operatively engaged with charge port 14 to permit the transfer of electric energy the battery 12 to a battery discharge system 56 through a cable 22. The battery discharge system 56 is arranged on a second vehicle 50. The second vehicle 50 is an emergency response vehicle, in one example. In some embodiments, the emergency response vehicle may be an ambulance, fire truck, police car, tow truck, or other type of first responder vehicle. In the example of FIG. 1, the second vehicle 50 is an all-electric vehicle, plug-in hybrid vehicle, fuel cell vehicle, or internally combusted vehicle. In one example, the second vehicle 50 is free of an electric motor or other device configured to propel the second vehicle via electricity or other energy source other than a liquid based fuel, such as gasoline or diesel. Additionally or alternatively, the second vehicle 50 may comprise a battery or other electrical energy storage device configured to receive electricity from the battery 12 while not being configured to propel the second vehicle 50. As such, the battery or other electrical energy storage device of the second vehicle may not be coupled to a powertrain. Additionally or alternatively, in some examples, the battery or other electrical energy storage device of the second vehicle 50 may be configured to at least partially propel the second vehicle 50.

In the example of FIG. 1, the second vehicle 50 comprise a crane 54, which may couple to a frame of the first vehicle 10 via a hook or other latching mechanism. In one example, the second vehicle 50 is configured to move the first vehicle 10. This may be desired in response to a collision, such as when the first vehicle 10 collides with another vehicle and/or object and is unable to propel itself. In one example, the second vehicle is a first responder vehicle, such as a tow truck, police car, fire truck, ambulance, or other similar vehicle.

The second vehicle 50 may include a control system 114. The control system includes a controller 112. In the illustration, the controller is shown receiving information from a plurality of sensors 116. These sensors may overlap with sensors of the sensor system and sending control signals to a plurality of actuators 181. In one example, the sensors 116 may include an imaging system configured to capture an image of the first vehicle 10, wherein an actuator of the plurality of actuators 181 is configured adjust a display device of the second vehicle 50 to display a plurality of instructions to the vehicle operator. In one example, the display device displays instructions to discharge the battery 12 to one of a first threshold load or a second threshold load based on a determined deformation of the battery 12 via the image of the first vehicle 10.

In the example of FIG. 1, a mobile display device 190 may be used to display instructions to a responder (e.g., the vehicle operator of the second vehicle 50). The mobile display device 190 may be a phone, tablet, or other similar device. The mobile device 190 may comprise a screen configured to display instructions and other images to the responder. The mobile device 190 may be wirelessly connected to the controller 112 via Wi-Fi, Bluetooth, or other wireless connections. In one example, the mobile device 190 may comprise an application or other software configured to guide the responder to discharge the battery 12. The mobile device 190 along with images displayed thereto are described in greater detail with respect to FIG. 3.

Upon arrival, the second vehicle 50 may be coupled to the first vehicle 10. In one example, a vehicle operator of the second vehicle 50 assesses deformation to the first vehicle 10, and determines if the battery 12 is degraded. In some examples, the vehicle operator may capture an image of a deformation to the vehicle battery 12, wherein the image may be compared to deformation thresholds. A controller of the second vehicle 50 may comprise instructions stored on non-transitory memory thereof that enable the controller to determine a magnitude of deformation, a location of deformation, and the like. Additionally or alternatively, the controller of the second vehicle 50 may communicate with a controller of the first vehicle 10 via the charging connector 20.

At any rate, if it is determined that the battery 12 is deformed to at least a first threshold magnitude, then the vehicle operator may be instructed to discharge at least a portion of a remaining charge of the battery 12 to the battery discharge system 56. In one example, the battery discharge system 56 comprises a super capacitor 56A and a cooling system 56B. In this way, the battery 12 may be efficiently discharged such that charge from the battery 12 flows to the super capacitor 56A via the cable 22 and the charging connector 20 to either a first threshold load or to a second threshold load. In one example, the first threshold load is equal to 1.5 V, wherein the first threshold load is selected in response to determining the deformation of the battery 12 is repairable. The second threshold load is equal to 0 V, wherein the second threshold load is selected in response to determining the deformation of the battery 12 is not repairable. In one example, the super capacitor 56A is arranged in series with a battery or with an energy storage device of the second vehicle 50, outside of the first vehicle 10. In some examples, the battery or the energy storage device arranged in series with the super capacitor 56A may be used to at least partially drive the second vehicle 50.

The cooling system 56B may be a liquid to air or air to air cooling system of the capacitor 56A. In one example, the cooling system 56B comprises a pump or other pressurization device configured to affect a flow of coolant through the cooling system 56B. The cooling system 56B may be fluidly separated from a cooling system of an engine of the second vehicle 50 in one example. In some examples, additionally or alternatively, the cooling system 56B may be fluidly coupled to the cooling system of the engine of the second vehicle 50, wherein a coolant pump may be shared between the two coolant systems.

Turning now to FIG. 2, it shows a method 200 for displaying instructions to a vehicle operator for discharging a battery of a vehicle in response to a vehicle collision deforming a battery structure. Instructions for carrying out method 200 may be executed by a controller based on computer-readable instructions stored on non-transitory memory of the controller and in conjunction with signals received from sensors of the engine system, such as the sensors described above with reference to FIG. 1. The controller may employ engine actuators of the engine system to adjust engine operation, according to the method described below.

The method 200 may begin at 202, which includes capturing an image of the collision. In one example, the image may be captured via a camera or other visualization device arranged on an emergency response vehicle reporting to a vehicle collision. In one example, the camera may be included in a vehicle visualization system for visualizing a surrounding environment of the emergency response vehicle for autonomous or semi-autonomous capabilities. Additionally or alternatively, a vehicle operator of the emergency response vehicle may capture the image of the collision via a camera, a phone, a tablet, or similar device, which may be uploaded to a server or directly provided to a controller of the emergency response vehicle.

The method 200 may proceed to 204, which includes comparing the image to images in a database. The magnitude, area, and other characteristics of the image may be compared to images stored in the database, wherein the comparison thereof may be used to determine the magnitude of the deformation and/or the degradation. In one example, there may be a plurality of databases, wherein each database corresponds to a specific make and model of the vehicle. Additionally or alternatively, databases may be categorized based on battery location, vehicle size, and the like.

Steps 202 and 204 are illustrated via dashed lines and may be optional in some embodiments of the method 200. In one example, the method 200 begins at 206 if a vehicle operator is trained in determining if a battery structure is deformed. Thus, the method 200 provides an option for a first responder not trained in determining deformation to the battery to follow instructions for discharging the battery if desired.

The method 200 proceeds to 206, which includes determining if a battery structure is deformed. This may include comparing a current battery deformation to a lower threshold and an upper threshold. The battery structure may be deformed if a vehicle collision results in a battery support frame, a battery mount, a battery housing, or other battery structure comprising a crack, a hole, or other degradation. In one example, if the current battery deformation is less than the lower threshold, then the battery may be minimally or not deformed and discharging may not be desired. If the current battery deformation is greater than the lower threshold and less than the upper threshold, then some discharging may be desired. If the current battery deformation is greater than the upper threshold, then it may be desired to drain an entire charge of the battery.

If the battery structure is not deformed, then the method 200 proceeds to 208, which includes not discharging battery. In one example, an alert, which may include a message displayed on a screen, may instruct the vehicle operator that discharge is not desired.

If the battery structure is deformed, then the method 200 proceeds to 210, which includes coupling the high-voltage battery discharge system of the emergency response vehicle (e.g., the second vehicle 50 of FIG. 1) to a charge port of the first vehicle (e.g., first vehicle 10 of FIG. 1).

The method 200 then proceeds to 212, which includes determining if the battery is repairable. In one example, the battery is repairable if components of a cathode are still maintained separate from components of an anode. Additionally or alternatively, the HV discharge system may apply a threshold voltage and/or current to the battery to measure a resistance of the battery. If the resistance is greater than a threshold resistance, then the battery may be repairable.

If the battery is repairable, then the method 200 proceeds to 214, which includes displaying instructions for discharging the battery to a first threshold value. In one example, the first threshold value is 1.5 V. However, other voltages may be used without departing from the scope of the present disclosure.

The method 200 proceeds to 216, which includes discharging the battery for a first duration.

The method 200 proceeds to 218, which includes disconnecting the first vehicle battery from the HV battery discharge system. As such, the response vehicle may no longer be electrically coupled to the battery of the first vehicle.

The method 200 proceeds to 220, which includes towing the vehicle. In this way, the response vehicle may move the vehicle with a reduced likelihood of further degradation of the first vehicle battery.

Returning to 212, if the battery is not repairable, then the method 200 proceeds to 222, which includes displaying instructions for discharging the battery to 0 V.

The method 200 proceeds to 224, which includes discharging the battery for a second duration. In one example, the second duration is greater than the first duration. Additionally or alternatively, at 224, discharging the battery for the second duration may include initially discharging the battery for a first amount of time equal to the first duration and then discharging the battery for a second amount of time following the first. Thus a sum of the first and second amounts of time is equal to the second duration. However, a first discharge rate during the first amount of time may be greater than a second discharge rate during the second amount of time.

The method 200 proceeds to 226, which includes disconnecting the first vehicle battery from the HV battery discharge system. As such, the response vehicle may no longer be electrically coupled to the battery of the first vehicle. The method 200 proceeds to 220 as described above.

Turning now to FIG. 3, it shows an embodiment 300 of the mobile display device 190. As such, components previously introduced are similarly numbered in this figure. The mobile display device 190 comprises a display 302. The display 302 may be a touch screen or other similar interactive screen. Additionally or alternatively, the display 302 may not be interactive. As such, the mobile display device 190 may comprise one or more buttons, knobs, or other control devices enabling a responder to communicate with the mobile display device 190.

The mobile display device 190 displays a first message 310 on the screen 302 reciting, "Capture an image of the vehicle." Upon capturing the image, the user may select a next button 304.

The mobile display device 190 proceeds to display a second message 320 on the screen 302, the second message 320 reciting, "Couple connector to battery port." Upon coupling the connector to the battery port, the user may select the next button 304.

The mobile display device 190 proceeds to display a third message 330 on the screen 302, the third message 330 reciting, "Battery is repairable." Thus, in the example of the instructions illustrated in FIG. 3, the battery is repairable, however, the battery may not be repairable in some examples, as described above. The condition of the battery may be determined via a combination of the image of the vehicle and the connector electrically coupled to the battery port. For example, battery degradation may be determined via the image, wherein the image may depict a leak, a crack, or other similar degradation to the battery and/or the battery housing. Additionally or alternatively, HV battery discharge system may measure a resistance of the battery via the connector coupled to the battery port to determine if the battery is repairable.

The mobile display device 190 proceeds to display a fourth message 340 on the screen 302, the fourth message 340 reciting, "Discharge battery to a first threshold voltage." In one example, the mobile display device 190 may begin a timer that corresponds to an estimated amount of time needed to discharge the battery from a present state of charge to the first threshold voltage. In one example, the estimated amount of time needed increases as the state of charge of the battery increases. As described above, the second threshold voltage may correspond to the battery being drained to 0V.

The mobile display device 190 proceeds to display a fifth message 350 on the screen 302, the fifth message 350 reciting, "Discharge complete! Disconnect connector from battery port." In one example, the fifth message 350 may be accompanied by an alert, which may be an audible alert (e.g., a beep) and/or a physical alert (e.g., a vibration).

The mobile display device 190 proceeds to display a sixth message 360 on the screen 302, the sixth message 360 reciting, "Attach tow cable to vehicle." The user may select the next button 304 upon completion of attaching the tow cable.

The mobile display device 190 proceeds to display a seventh message 370 on the screen 302, the seventh message 370 reciting, "Tow vehicle." In this way, the user may remove the vehicle from the collision In this way, a battery discharge system is arranged on an emergency response vehicle and configured to provide instructions to a vehicle operator to discharge a battery of an electric vehicle. The technical effect of arranging the battery discharge system on the emergency response vehicle is to allow a first responder to ensure the battery is discharged to prevent further degradation during transport or storage. By doing this, the electric vehicle may be reliably discharged independent of a magnitude of deformation caused during the vehicle collision.

An emergency response vehicle comprises a battery discharge system having a charging connector configured to electrically couple a capacitor of the emergency response vehicle to a battery of an electric vehicle.

A first example of the emergency response vehicle further includes where the battery discharge system further comprises a cooling arrangement.

A second example of the emergency response vehicle, optionally including the first example, further includes where the cooling arrangement is fluidly separated from a cooling system of the emergency response vehicle.

A third example of the emergency response vehicle, optionally including one or more of the previous examples, further includes where the cooling arrangement is fluidly coupled to a cooling system of the emergency response vehicle.

A fourth example of the emergency response vehicle, optionally including one or more of the previous examples, further includes where the battery discharge system comprises a display device configured to display instructions to a vehicle operator of the emergency response vehicle.

An example of a system comprises a first vehicle comprising a capacitor and a charging connector, wherein the charging connector is configured to connect to a charging port of a second vehicle and a controller having computer-readable instructions stored on non-transitory memory thereof that when executed enable the controller to display instructions on a screen to discharge a battery of the second vehicle to a first threshold load in response to a deformation of the second vehicle being greater than a lower threshold and less than an upper threshold and display instructions on the screen to discharge the battery of the second vehicle to a second threshold load, which is greater than the first threshold load, in response to the deformation of the second vehicle being greater than the upper threshold.

A first example of the system, further includes where the first vehicle is an emergency response vehicle and the second vehicle is an electric vehicle.

A second example of the system, optionally including the first example, further includes where the first vehicle is a tow truck, a fire truck, a police car, or an ambulance.

A third example of the system, optionally including one or more of the previous examples, further includes where the first vehicle comprises a capacitor cooling system.

A fourth example of the system, optionally including one or more of the previous examples, further includes where the instructions further enable the controller to capture an image of the second vehicle.

A fifth example of the system, optionally including one or more of the previous examples, further includes where the instructions further enable the controller to compare the image to a plurality of images stored in a database, wherein a magnitude of the deformation is based on a comparison of the image to the plurality of images.

A sixth example of the system, optionally including one or more of the previous examples, further includes where instructions on the screen display a message to a user to couple the charging connector to the charging port.

A seventh example of the system, optionally including one or more of the previous examples, further includes where the deformation is further determined based on a resistance of the battery, wherein the resistance is sensed in response to a current supplied to the battery via the charging connector.

An eighth example of the system, optionally including one or more of the previous examples, further includes where the screen is arranged on an exterior of the first vehicle.

A ninth example of the system, optionally including one or more of the previous examples, further includes where the screen is arranged on a mobile device.

An embodiment of a response vehicle comprises a high-voltage battery discharge system comprising a cooling system and a charging connector configured to couple to a charging port of an electric vehicle, wherein the high-voltage battery discharge system comprises a capacitor arranged in series with an energy storage device to receive a charge from a battery of the electric vehicle.

A first example of the response vehicle further includes where a mobile device configured to display instructions to a user of the response vehicle to determine a degradation of the battery of the electric vehicle, wherein the mobile device displays instructions to drain the battery to a first threshold voltage in response to the battery being repairable, and wherein the mobile device displays instructions to drain the battery to a second threshold voltage, which is less than the first threshold voltage, in response to the battery not being repairable.

A second example of the response vehicle, optionally including the first example, further includes where the mobile device is further configured to analyze and compare images of the electric vehicle to a database to determine the degradation of the battery of the electric vehicle.

A third example of the response vehicle, optionally including one or more of the previous examples, further includes where the energy storage device is not coupled to a powertrain of the response vehicle.

A fourth example of the response vehicle, optionally including one or more of the previous examples, further includes where the energy storage device is a battery of the response vehicle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An emergency response vehicle, comprising:
a battery discharge system having a charging connector and a capacitor, the capacitor arranged in series with a battery or an energy storage device of the emergency vehicle and configured to receive a charge from a battery of an electric vehicle, and the charging connector configured to electrically couple the capacitor to the battery of the electric vehicle; and
a mobile device separate from the battery discharge system, wirelessly connected to a controller of the battery discharge system, and configured to display instructions to a user of the response vehicle to determine a degradation of the battery of the electric vehicle.

2. The emergency response vehicle of claim 1, wherein the battery discharge system further comprises a cooling arrangement.

3. The emergency response vehicle of claim 2, wherein the cooling arrangement is fluidly separated from a cooling system of the emergency response vehicle.

4. The emergency response vehicle of claim 2, wherein the cooling arrangement is fluidly coupled to a cooling system of the emergency response vehicle.

5. The emergency response vehicle of claim 1, wherein the battery discharge system comprises a display device and controller having computer-readable instructions stored on non-transitory memory thereof that when executed enable the controller to display instructions to a vehicle operator of the emergency response vehicle.

6. The emergency response vehicle of claim 1, wherein the capacitor comprises a super capacitor.

7. The emergency response vehicle of claim 1, wherein the mobile device displays instructions to drain the battery to a first threshold voltage in response to the battery being repairable.

8. The emergency response vehicle of claim 7, wherein the mobile device displays instructions to drain the battery to a second threshold voltage, which is less than the first threshold voltage, in response to the battery not being repairable.

9. A response vehicle, comprising:
a high-voltage battery discharge system comprising a capacitor and a charging connector, wherein the charging connector is configured to couple to a charging port of an electric vehicle, and the capacitor is arranged in series with an energy storage device of the response vehicle to receive a charge from a battery of the electric vehicle; and
a mobile device configured to display instructions to a user of the response vehicle to determine a degradation of the battery of the electric vehicle, wherein the mobile device displays instructions to drain the battery to a first threshold voltage in response to the battery being repairable, and wherein the mobile device displays instructions to drain the battery to a second threshold voltage, which is less than the first threshold voltage, in response to the battery not being repairable.

10. The response vehicle of claim 9, wherein the high-voltage battery discharge system comprises a cooling system.

11. The response vehicle of claim 9, wherein the mobile device is further configured by a controller to analyze and compare images of the electric vehicle to a database to determine the degradation of the battery of the electric vehicle.

12. The response vehicle of claim 9, wherein the energy storage device is not coupled to a powertrain of the response vehicle.

13. The response vehicle of claim 9, wherein the energy storage device is a battery of the response vehicle.

14. The response vehicle of claim 9, wherein the capacitor is a super capacitor.

15. A response vehicle, comprising:
a high-voltage battery discharge system comprising a cooling system and a charging connector configured to couple to a charging port of an electric vehicle, wherein the high-voltage battery discharge system comprises a capacitor arranged in series with an energy storage device to receive a charge from a battery of the electric vehicle; and a mobile device configured to display instructions to a user of the response vehicle to determine a degradation of the battery of the electric vehicle, wherein the mobile device displays instructions to drain the battery to a first threshold voltage in response to the battery being repairable, and wherein the mobile device displays instructions to drain the battery to a second threshold voltage, which is less than the first threshold voltage, in response to the battery not being repairable.

16. The response vehicle of claim 15, wherein the mobile device is further configured by a controller to analyze and compare images of the electric vehicle to a database to determine the degradation of the battery of the electric vehicle.

17. The response vehicle of claim 15, wherein the energy storage device is not coupled to a powertrain of the response vehicle.

18. The response vehicle of claim 15, wherein the energy storage device is a battery of the response vehicle.

* * * * *